(Model.)

J. GOSS.
BARBED FENCE.

No. 282,453. Patented July 31, 1883.

Witnesses;
E. P. King
M. R. Smith

Inventor,
Joseph Goss

UNITED STATES PATENT OFFICE.

JOSEPH GOSS, OF BELOIT, WISCONSIN, ASSIGNOR, BY DIRECT AND MESNE ASSIGNMENTS, TO THE MONITOR WORKS, OF SAME PLACE.

BARBED FENCE.

SPECIFICATION forming part of Letters Patent No. 282,453, dated July 31, 1883.

Application filed October 31, 1882. (Model.)

*To all whom it may concern:*

Be it known that I, JOSEPH GOSS, a citizen of the United States, residing at the city of Beloit, in the county of Rock and State of Wisconsin, have invented certain new and useful Improvements in Barbed-Wire Fencing, of which the following is a specification.

My invention relates to improvements in barbed-wire fencing, in which the barb revolves and pricks the skin without tearing or cutting it, thus saving a loss in stock of all kinds.

My invention consists of two wires running parallel to each other, having a spur or disk adapted to revolve upon an axis whose ends are bent around two adjoining parallel wires and serve to support the spur or disk in a horizontal position, as hereinafter more fully described, and particularly pointed out in the claim.

Figure 1:
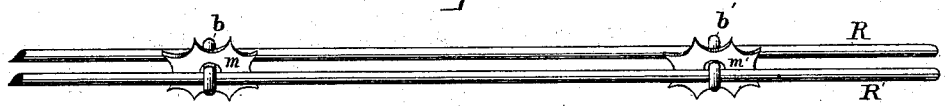
Figure 2:
Figure 3:
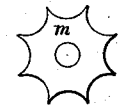

In the accompanying drawings, Figure 1 is a view of the fence put together ready for use, showing the two parallel wires, the S-shaped piece connecting the two parallel wires, and the revolving spur or toothed disk. Fig. 2 is a sectional view, showing the S-shaped wire for holding or connecting the two main or parallel wires, also for holding the revolving spur. Fig. 3 is a view of the revolving spur or disk.

Similar letters refer to like parts in the different views.

In the accompanying drawings, R R' are the two main or parallel wires. $b\ b'$ are the S-shaped wires, which connect the parallel wires and form the axis of the revolving spurs $m\ m'$. The revolving spurs are held and maintained in a horizontal position, or at about right angles to the parallel wires, by the ends of the S-shaped pieces $b\ b'$, which are cut and formed by a suitable device, said ends being bent inwardly in juxtaposition with the spurs, forming stops therefor on one side, the oblique axis of the spur forming stops on the opposite side. The S-shaped wires $b\ b'$ are, by a suitable device, fastened to the two main or parallel wires R R' at desirable distances apart, keeping the said parallel wires R R' from twisting, and also holding the revolving spurs $m\ m'$ so that they will always revolve between the two parallel wires R R' when any side pressure is applied to them.

If desired, the parallel wires R R' can be flattened or an indenture made in them where they are connected by S-shaped wires $b\ b'$.

The spurs can be made by dies or other suitable device.

I attach importance to the manner in which I pivot and hold the spurs in position.

I claim and desire to secure by Letters Patent—

The combination of two parallel wires with a spur and an S-shaped piece, which forms an oblique axis for the spur, its ends being bent around the wires and adapted to hold or support the spur in position, as and for the purpose set forth.

JOSEPH GOSS.

In presence of—
    CHAS. B. SCOTT,
    OSCAR T. THOMPSON.